United States Patent
Tsuge et al.

(10) Patent No.: US 6,492,804 B2
(45) Date of Patent: Dec. 10, 2002

(54) DETECTED SIGNAL PROCESSING DEVICE FOR ROTATING SENSOR AND DETECTED SIGNAL OUTPUTTING METHOD THEREFOR

(75) Inventors: Hiroyuki Tsuge, Nisshin (JP); Mikio Tanabe, Nagoya (JP)

(73) Assignee: Denso Corporation, Kariya (JP)

( * ) Notice: Subject to any disclaimer, the term of this patent is extended or adjusted under 35 U.S.C. 154(b) by 2 days.

(21) Appl. No.: 09/729,957

(22) Filed: Dec. 6, 2000

(65) Prior Publication Data

US 2001/0002791 A1 Jun. 7, 2001

(30) Foreign Application Priority Data

Dec. 7, 1999 (JP) .......................... 11-347541

(51) Int. Cl.[7] .......................... G01P 3/48; G01P 13/00; G06F 17/00
(52) U.S. Cl. .................. 324/166; 324/165; 324/174; 341/671; 701/71
(58) Field of Search ............... 324/166, 174, 324/207.12, 207.2, 207.25, 165; 303/92, 199, 122.06; 701/70, 71; 188/181 R; 340/671, 672

(56) References Cited

U.S. PATENT DOCUMENTS

| 3,728,565 A | * | 4/1973 | O'Callaghan | ............... 310/168 |
| 3,757,167 A | * | 9/1973 | Yoshikawa et al. | ............. 317/5 |
| 4,092,853 A | * | 6/1978 | Schneider et al. | ............. 73/121 |
| 4,629,982 A | * | 12/1986 | Kieslich | ..................... 324/208 |
| 4,836,616 A | * | 6/1989 | Roper et al. | .................. 303/92 |
| 4,931,727 A | * | 6/1990 | Yamanoue et al. | ......... 324/172 |
| 4,969,695 A | * | 11/1990 | Maehata et al. | .............. 303/92 |
| 5,500,585 A | * | 3/1996 | Aab | ........................... 324/165 |
| 6,109,102 A |   | 8/2000 | Schneider | .................... 73/488 |
| 6,242,904 B1 | * | 6/2001 | Shirai et al. | ................ 324/165 |

FOREIGN PATENT DOCUMENTS

| JP | 4-104007 | 4/1992 |
| JP | 10-332725 | 12/1998 |
| WO | WO 98/35329 | 8/1998 |

* cited by examiner

Primary Examiner—Edward Lefkowitz
Assistant Examiner—Darrell Kinder
(74) Attorney, Agent, or Firm—Harness, Dickey & Pierce, PLC (57) ABSTRACT

The rotation of a rotating magnet is detected by magnetic sensors. The rotational speed is detected from pulse signals detected by magnetic sensors, and the rotational direction is detected from the difference in a shift in phase. Signals different in pulse width are generated according to the rotational direction. A signal selection circuit outputs a pulse signal with timing for the rotational speed. A rotational speed determining circuit outputs a decision signal Sf of a high level when the rotational speed reaches a predetermined speed. When a self-diagnostic circuit determines that the magnetic sensors have malfunctioned, a binary error code generating circuit generates an error signal Sg and a 4-bit error code signal Sh. When the signal Sf of the rotating magnet is brought to a high level, the signal selection circuit outputs an error code signal and allows output an output current Is.

12 Claims, 9 Drawing Sheets

DETECTED SIGNAL PROCESSING DEVICE FOR ROTATING SENSOR AND DETECTED SIGNAL OUTPUTTING METHOD THEREFOR

CROSS-REFERENCE TO RELATED APPLICATION

The present invention is related to Japanese patent application No. Hei. 11-347541, filed Dec. 7, 1999; the contents of which are incorporated herein by reference.

FIELD OF THE INVENTION

The present invention relates to a detected signal processing device, and more particularly, to a detected signal processing device suitable for a rotating sensor that detects a rotational direction and a rotational speed of a rotor and outputting rotational direction signals different in waveform according to the rotational direction based on the result of detection with timing corresponding to the detected rotational speed.

BACKGROUND OF THE INVENTION

A detected signal processing device for the rotating sensor is known as disclosed in JP-A No. H10-70524. This discloses a rotating sensor of a type or system wherein information other than a rotational speed, such as a rotational direction, self-diagnostic information is superimposed on a rotational pulse signal as binary data, and the generated signal is transmitted. In such a device, however, a binary data word corresponding to data is additionally provided between pulse signals indicative of a rotational speed. Thus, since the time interval between the pulse signals becomes short as the rotational speed becomes fast, a transmittable data length is limited.

When, for example, a pulse width (time) of a pulse signal, which constitutes a data word, is narrowed (shortened) to avoid it, the number of bits for the data word can be increased even at the same rotational speeds. When the numbers of bits for data words are set identical to each other, the upper limit of a detectable rotational speed can be increased.

However, the shortening of the pulse width in this way means nonresistance to noise upon a detecting operation. A trade-off relation is established between characteristics of the two. In either case, restraints are placed on a transmittable data word at high rpm.

SUMMARY OF THE INVENTION

The present invention has been made in view of the foregoing. An object of the present invention is to provide a detected signal processing device for a rotating sensor and a detected signal outputting method therefor, which are capable of reliably transmitting signals without restraints placed thereon due to a rotational speed and an adverse effect exerted thereon due to noise, even if a signal indicative of a rotational direction and other data are added to a signal indicative of the rotational speed.

Accordingly, in a first aspect of the invention, there is provided a detected signal processing device suitable for a rotating sensor. A determining means determines whether the rotational speed of a rotor reaches a predetermined rotational speed. Signal pattern generating means utilizes rotational direction signals in combination to thereby generate each transfer signal different from the rotational direction and rotational speed of the rotor as a signal pattern. Signal processing means outputs a signal generated by the signal pattern generating means with timing corresponding to the rotational speed when the signal generated by the signal pattern generating means exists, where it is determined by the determining means that the rotational speed of the rotor has reached the predetermined rotational speed.

Since the rotational direction does not change suddenly when the rotational speed reaches the predetermined rotational speed since the rotor starts rotating in either a normal rotational direction or a reverse rotational direction, the rotational direction can be regarded as being maintained even though the rotational direction signals are not output continuously. Further, if the state of the rotational direction is output as the rotational direction signals again when the rotational speed reaches a state where the rotor may be rotated in the reverse direction as the rotational speed is reduced, then the state of the rotation of the rotor can sufficiently be represented as a detected signal.

In such a state in which the rotational speed of the rotor reaches the predetermined rotational speed, the output of either one of signals corresponding to the direction of rotation thereof with the timing indicative of the rotational speed allows the recognition of the rotational speed. Therefore, the signal patterns generated by combining signals different in waveform corresponding to the rotational direction in plural form can be output as transfer signals.

Thus, the transfer signals other than the rotational speed and the rotational direction can be output using the rotational direction signals different in waveform at other than the rotational speed at which no change is considered to occur in the rotational direction of the rotor. Even when the rotational speed of the rotor becomes fast, the signal pattern for each transfer signal can sufficiently be recognized within a range in which the rotational direction signals can be recognized. Therefore, the transfer signal or pulse signal can reliably be output without placing restraints or the like on its pulse width and the number of pulses thereof as distinct from the case where another signal pattern is superimposed between the conventional pulse signals indicative of the rotational speeds and the result of superimposition is output.

According to another aspect of the invention, rotational direction signals different in waveform corresponding to a rotational direction are utilized in combination in plural form on condition that the rotational speed of a rotor reaches a predetermined rotational speed or higher to thereby generate each transfer signal different from the rotational direction and rotational speed of the rotor as a signal pattern. The generated signal is output with timing corresponding to the rotational speed. Thus, since the rotor is kept at the predetermined rotational speed and the rotational direction does not change in such a state, the transfer signal corresponding to the signal pattern generated by utilizing the different rotational direction signals in combination in plural form can be output as an alternative to the output thereof as each rotational direction signal. Thus, each transfer signal can be output with timing indicative of the rotational speed of the rotating sensor. Further, since the transfer signal can be recognized if the rotational direction signal can be recognized at this time, the transfer signal can reliably be output without being affected by the rotational speed.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DESCRIPTION OF THE PREFERRED EMBODIMENTS

Figure 1:
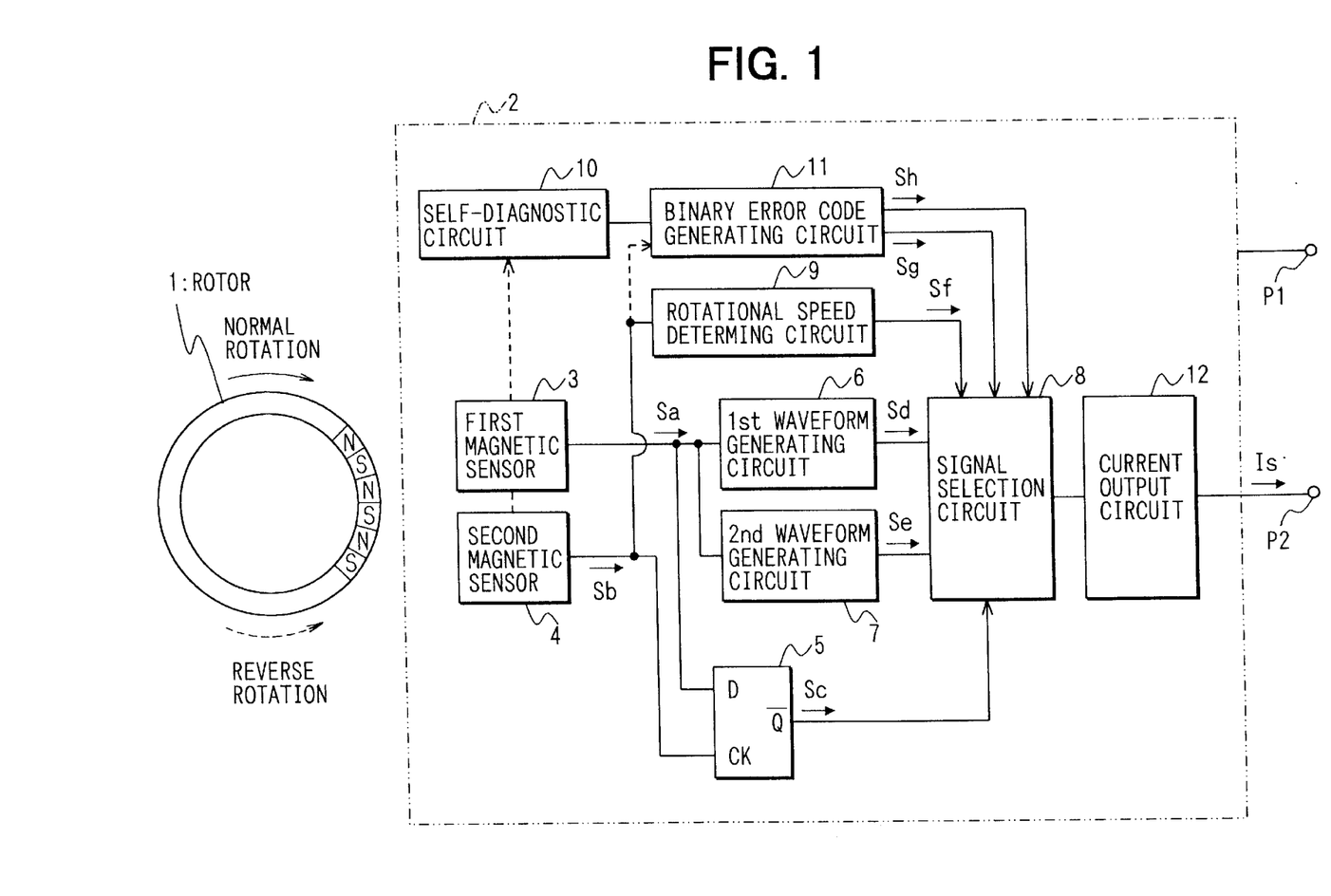
FIG. 1 is a schematic diagram showing a first embodiment of the present invention.

The present invention is mounted to a rotation detector unit attached to each wheel to detect the state of wheel rotation necessary for control of an ABS (Antilock Brake System) or the like. It is provided to detect normal and reverse rotations ranging from low-speed rotation to high-speed rotation with high accuracy. A rotating magnet 1 used as a rotor, which is an object to detect the rotational direction and the rotational speed, is provided to rotate integrally with an vehicle tire. In the rotating magnet 1, N and S poles are formed to be polarized around its outer peripheral portion with a predetermined pitch along a circumferential direction thereof. For example, 48 pairs of magnetic poles are formed around the outer peripheral portions thereof. A rotation detecting device 2 is arranged in association with the rotating magnet 1, and detects the N and S poles of the rotating magnet 1 and outputs their detected signals therefrom.

Figures 7A, 7B:
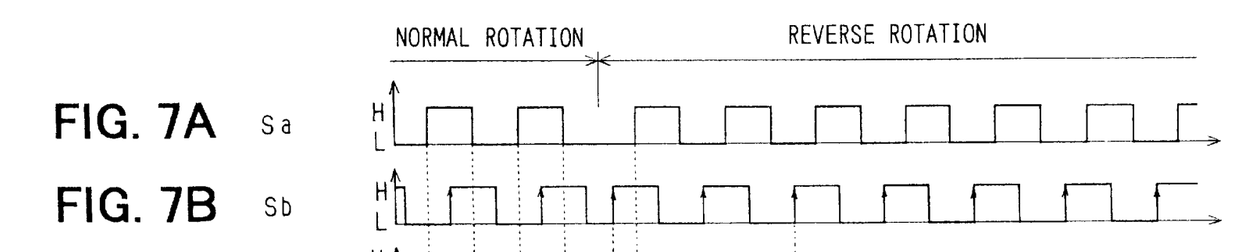
FIG. 7A is a waveform chart showing signals output from a unit in an error production-free case according to the present invention.
FIG. 7B is a waveform chart showing signals output from a unit in an error production-free case according to the present invention.

In the rotation detecting device 2, first and second magnetic sensors 3 and 4 used as sensor elements are configured to output detected signals by using magneto-resistance elements (MRE). Both are placed opposite the outer peripheral portion of the rotating magnet 1. The interval between the two is set to a distance obtained by adding a distance corresponding to a ¼ pitch to a distance equal to an integral multiple of the pitch of a pair of N and S poles or subtracting it therefrom. As will be described later, the magnetic sensors 3 and 4 respectively output such rectangular detected signals Sa and Sb as shown in FIGS. 7A and 7B with a ¼ phase difference therebetween according to the rotation of the rotating magnet 1.

A latch circuit 5 used as rotational direction determining means comprises a D-type flip-flop. An output terminal of the first magnetic sensor 3 is connected to a data input terminal D of the latch circuit 5, and an output terminal of the second magnetic sensor 4 is connected to a clock input terminal CK. A terminal $\overline{Q}$ for outputting a reverse signal output signal is used to output a decision signal Sc (see FIGS. 7C and 8C) indicative of the rotational direction at an output level.

Output waveform generating means comprises first and second output waveform generating circuits 6 and 7, and a signal selection circuit 8 used as signal processing means and count means. The first and second output waveform generating circuits 6 and 7 have input terminals to which an output terminal of the first magnetic sensor 3 is connected, and respectively output pulse signals Sd and Se each having a first time width T1 and pulse signals Sd and Se each having a second time width T2 (where T2>T1) (see FIGS. 7D and 7E and FIGS. 8D and 8E). Output terminals of the first and second output waveform generating circuits 6 and 7 are respectively connected to two input terminals of the signal selection circuit 8. The output terminal $\overline{Q}$ of the latch circuit 5 is connected to a control input terminal.

Figure 7C:
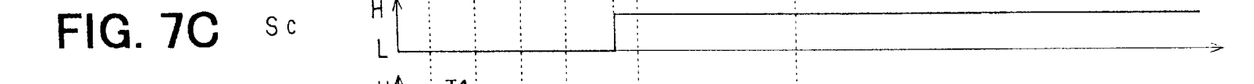
FIG. 7C is a waveform chart showing signals output from a unit in an error production-free case according to the present invention.
Figure 7D:
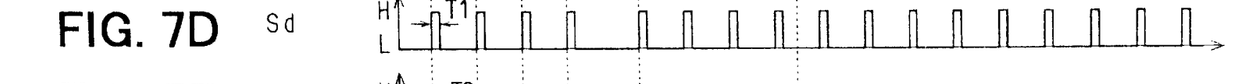
FIG. 7D is a waveform chart showing signals output from a unit in an error production-free case according to the present invention.
Figure 7E:
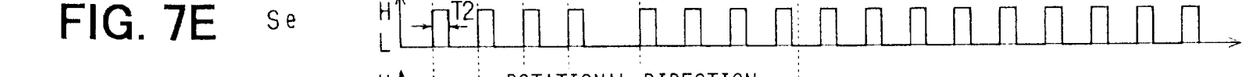
FIG. 7E is a waveform chart showing signals output from a unit in an error production-free case according to the present invention.
Figure 7F:
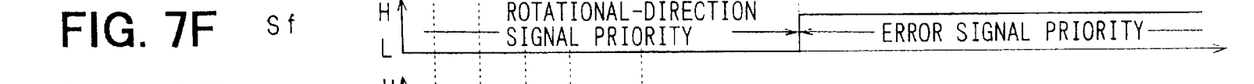
FIG. 7F is a waveform chart showing signals output from a unit in an error production-free case according to the present invention.

A rotational speed determining circuit 9 used as determining means is configured to input the detected signal Sb output from the second magnetic sensor 4. When the rotational speed of the rotating magnet 1 reaches a predetermined rotational speed, the rotational speed determining circuit 9 outputs a decision signal Sf (see FIGS. 7F and 8F) which changes from a low to a high levels, to the signal selection circuit 8, based on the detected signal Sb. In this case, a low level signal of the decision signal Sf is output as a signal indicative of rotational-direction signal priority, and a high level signal thereof is output as error signal priority.

A self-diagnostic circuit 10 generates a transfer signal corresponding to another signal. The self-diagnostic circuit 10 determines the state of operation of the first and second magnetic sensors 3 and 4. When it is found from the result of determination that a malfunction has occurred, the self-diagnostic circuit 10 produces a transfer signal corresponding to its malfunction and outputs it to a binary error code generating circuit 11. In this case, the self-diagnostic circuit 10 measures, for example, levels detected by the magnetic sensors 3 and 4 to thereby determine whether each of the detected levels is equivalent to a level which allows the enough detection of a rotational signal. Further, the self-diagnostic circuit 10 detects such a state that the detected level is lowered even if the decision as to the detection of rotation is done, and outputs information indicative of abnormal conditions of either or both of the magnetic sensors 3 and 4 as a transfer signal. Such a reduction in detected level occurs where, for example, the magnetic sensors 3 and 4 are shifted from their normal positions opposite to the rotating magnet 1.

Figure 7G:
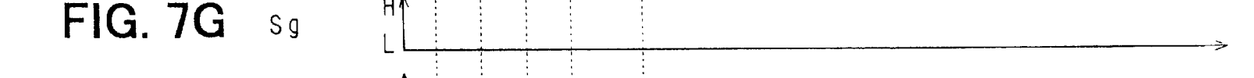
FIG. 7G is a waveform chart showing signals output from a unit in an error production-free case according to the present invention.
Figures 7H, 7I:
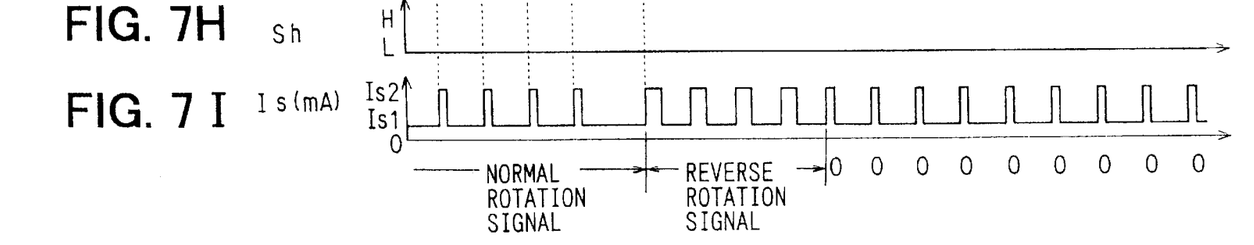
FIG. 7H is a waveform chart showing signals output from a unit in an error production-free case according to the present invention.
FIG. 7I is a waveform chart showing signals output from a unit in an error production-free case according to the present invention.
Figure 8A:
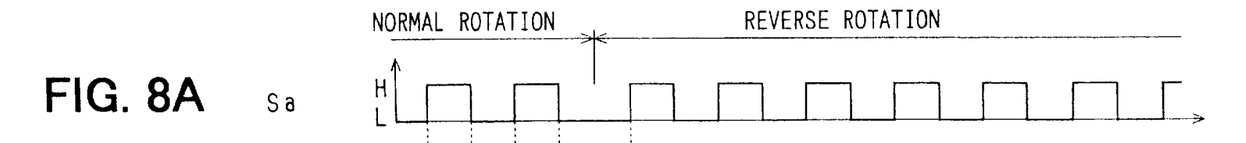
FIG. 8A is a waveform chart illustrating signals output from a unit where an error occurs according to the present invention.
Figure 8B:
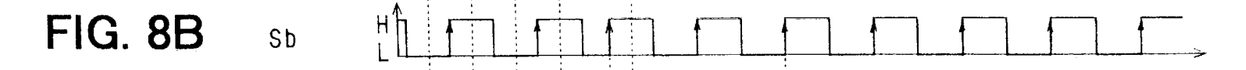
FIG. 8B is a waveform chart illustrating signals output from a unit where an error occurs according to the present invention.
Figure 8C:
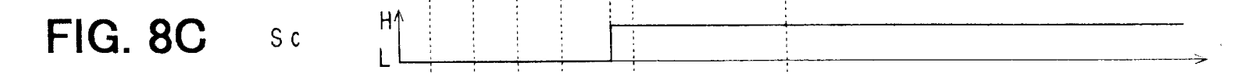
FIG. 8C is a waveform chart illustrating signals output from a unit where an error occurs according to the present invention.
Figure 8D:
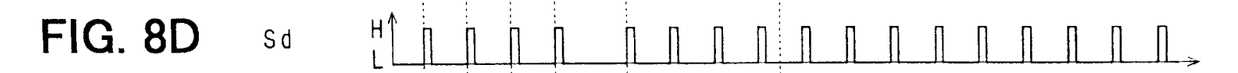
FIG. 8D is a waveform chart illustrating signals output from a unit where an error occurs according to the present invention.
Figure 8E:
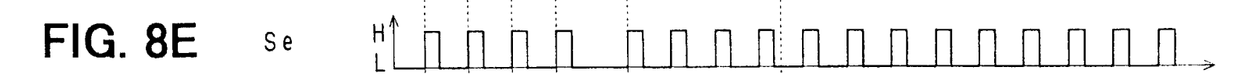
FIG. 8E is a waveform chart illustrating signals output from a unit where an error occurs according to the present invention.
Figure 8F:
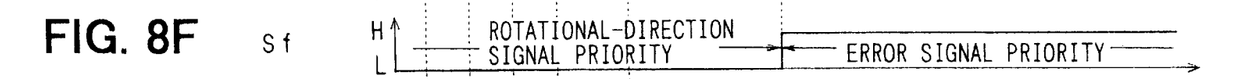
FIG. 8F is a waveform chart illustrating signals output from a unit where an error occurs according to the present invention.
Figure 8G:
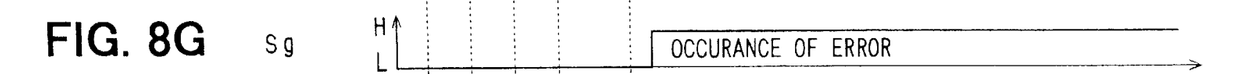
FIG. 8G is a waveform chart illustrating signals output from a unit where an error occurs according to the present invention.
Figure 8H:
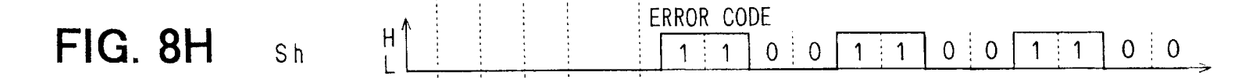
FIG. 8H is a waveform chart illustrating signals output from a unit where an error occurs according to the present invention.

The binary error code generating circuit 11 generates signals, based on the signals indicative of the states of the magnetic sensors 3 and 4, which are supplied from the self-diagnostic circuit 10, as error codes made up of predetermined bits, and outputs them to the signal selection circuit 8 as an error signal Sg (see FIGS. 7G and 8G) and an error code signal Sh (see FIGS. 7H and 8H). The error code comprises four bits, for example. The error code is created in such a manner that a high level bit is placed as a head or leading bit of the four bits and three bits following it represent which one of the magnetic sensors 3 and 4 malfunctions. According to the so-created error code signal Sh, whether either or both of the first and second magnetic sensors 3 and 4 have malfunctioned, can be obtained as a signal pattern.

As will be described later, the signal selection circuit 8 supplies an output signal selected and set based on the respective signals Sc, Sf and Sh input from the latch circuit 5, the rotational speed determining circuit 9 and the binary error code generating circuit 11 in response to the pulse signals Sd and Se input from the first output waveform generating circuit 6 and the second output waveform generating circuit 7.

Figure 8I:
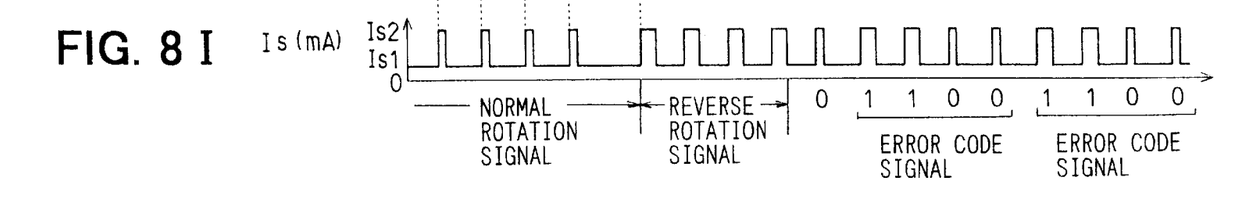
FIG. 8I is a waveform chart illustrating signals output from a unit where an error occurs according to the present invention.
Figure 9A:
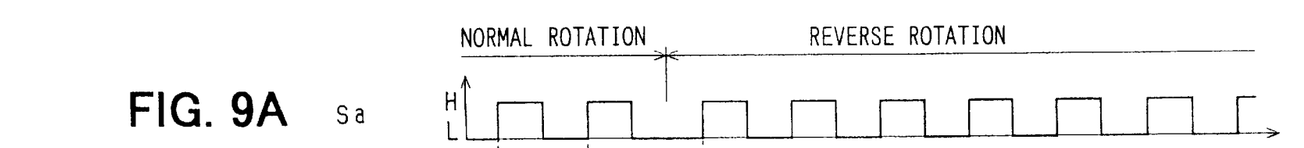
FIG. 9A is a diagram showing output without error according to a second embodiment of the present invention.
Figure 9B:
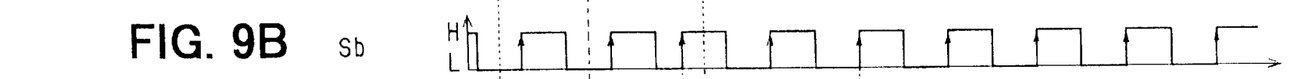
FIG. 9B is a diagram showing output without error according to a second embodiment of the present invention.
Figure 9C:
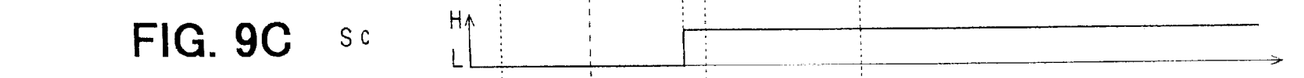
FIG. 9C is a diagram showing output without error according to a second embodiment of the present invention.
Figure 9D:
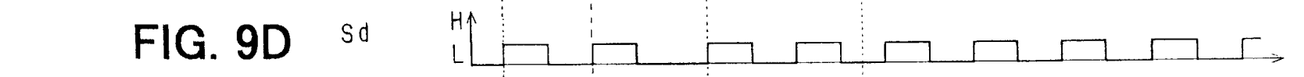
FIG. 9D is a diagram showing output without error according to a second embodiment of the present invention.
Figure 9E:
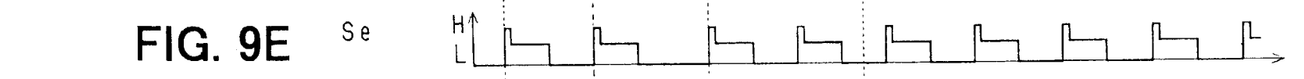
FIG. 9E is a diagram showing output without error according to a second embodiment of the present invention.
Figure 9F:
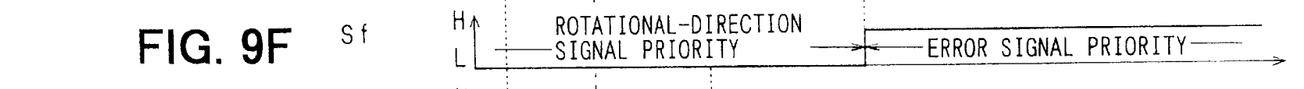
FIG. 9F is a diagram showing output without error according to a second embodiment of the present invention.
Figure 9G:
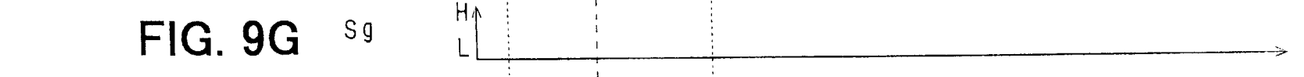
FIG. 9G is a diagram showing output without error according to a second embodiment of the present invention.
Figure 9H:
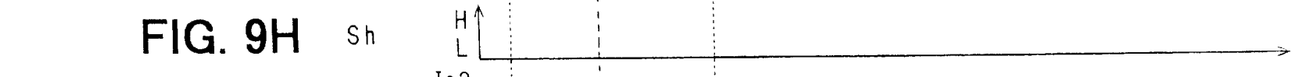
FIG. 9H is a diagram showing output without error according to a second embodiment of the present invention.
Figure 9I:
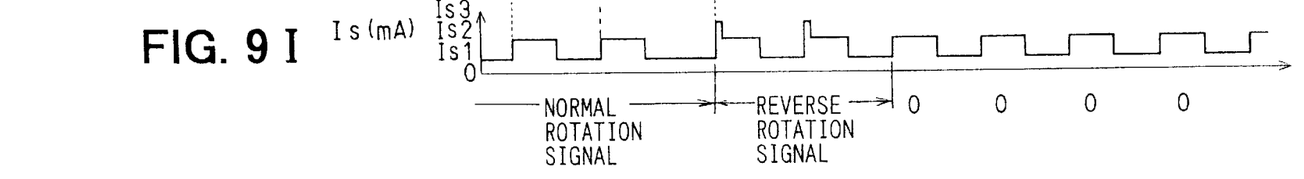
FIG. 9 is a diagram showing output without error according to a second embodiment of the present invention.

A current output circuit 12 changes an output current Is (see FIGS. 7I and 8I) to either of levels Is1 and Is2 of two different current values and outputs it therefrom. When the level of the output signal supplied from the signal selection circuit 8 is low, the current output circuit 12 provides a flow of the output current Is1 as a current value of a low level equivalent to the current consumption of the entire device. When the level of the output signal supplied from the signal selection circuit 8 is high, the current output circuit 12 provides a flow of the output current Is2 as a current value of a high level to which a predetermined current value Ic is added, from an internally-provided constant current source.

The rotation detecting device 2 is provided with two external terminals P1 and P2 as input/output terminals. Power terminals for the respective circuits, which are provided inside the device, are connected to the external terminal P1. The power terminals serve as power input terminals for supplying power from an external source to these respective circuits. The output terminal of the current output circuit 12 is connected to the external terminal P2, and the output current Is output according to the state of rotation of the rotating magnet 1 is output therethrough.

Figure 2:
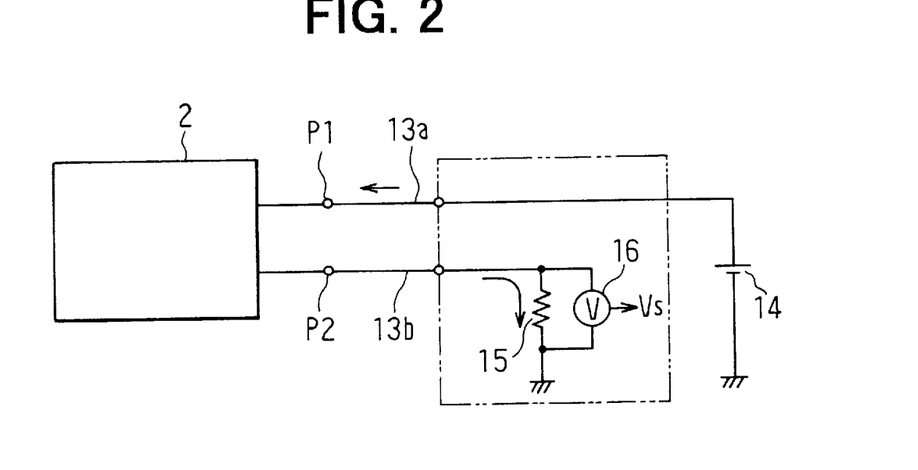
FIG. 2 is a schematic diagram of an external circuit according to the present invention.

Such a rotation detecting device 2 is connected to an arithmetic circuit unit mounted to a vehicle predetermined portion through two signal lines 13a and 13b from the two external terminals P1 and P2 as shown in FIG. 2. In this case, the external terminal P1 is connected to a positive-role terminal of a vehicle-mounted battery 14 through the signal line 13a, and the external terminal P2 is connected to a ground terminal through a detection resistor 15 from the signal line 13b. Voltage detecting means 16 is connected to the detection resistor 1, and a voltage signal Vs detected thereby is input to an unillustrated arithmetic circuit unit.

The operation of the present embodiment will next be described with reference to flowcharts shown in FIGS. 3 through 6 and timing charts shown in FIGS. 7 and 8. FIGS. 3 through 6 show the process of selecting each signal output from the signal selection circuit 8 to the current output circuit 12 according to conditions, based on the input various signals. FIGS. 7 and 8 show waveforms of signals at the respective portions when the rotating magnet 1 is changed from the normally-rotated state to the reverse rotation. Of these, FIG. 7 shows the waveforms at the time that no error code signal is produced, and FIG. 8 shows the waveforms at the time that the error code signal is produced. In the following description, the operation of outputting the signals from the respective units will be explained in brief, and the operation of the signal selection circuit 8 will be explained subsequently.

When the rotating magnet 1 is rotated in a normal rotational direction or a reverse rotational direction, the first and second magnetic sensors 3 and 4 respectively output signals Sa and Sb having such waveforms as shown in FIGS. 7A and 7B and FIGS. 8A and 8B correspondingly. In this case, the signals output from the magnetic sensors 3 and 4 result in high-level signals where N poles of magnetic poles formed around the outer periphery of the rotating magnet 1 in large numbers are opposed to them. Further, the signals become low-level signals where S poles are opposed to them. When the rotating magnet 1 is rotated once with the time required to oppose the adjacent N poles to them as one cycle or period T, a pulse signal corresponding to P periods or cycles (e.g., 48 cycles) is output.

Since the cycle of a signal output of the first magnetic sensor 3 and the cycle of a signal output of the second magnetic sensor 4 are shifted from each other by a ¼ cycle as described above, the signals are output where their waveforms are being shifted as shown in the drawing. When, at this time, the rotating magnet 1 is being rotated in the normal rotational direction, the signal of the first magnetic sensor 3 reaches a high level with timing (corresponding to the rising edge of each waveform, which is indicated by arrow in the drawing) at which the output of the second magnetic sensor 4 is changed to a high level). When the rotating magnet 1 is being rotated in a reverse rotational direction, the signal of the first magnetic sensor 3 results in a low level.

Thus, the determination of the output level of the first magnetic sensor 3 with the rise timing of the second magnetic sensor 4 makes it possible to determine the direction of rotation of the rotating magnet 1. The latch circuit 5 outputs a signal Sc indicative of the direction of rotation, based on the aforementioned principle. The latch circuit 5 outputs a low level signal from the output terminal $\overline{Q}$ when the rotating magnet 1 is in the normal rotational direction, whereas when the rotating magnet 1 is in the reverse rotational direction, the latch circuit 5 outputs a high level signal therefrom (FIGS. 7C, 8C).

The binary error code generating circuit 11 outputs a signal Sh indicative of the result of diagnosis according to the 4-bit error code as described above in addition to an error signal Sg indicative of the presence or absence of an error. However, the signal Sh is set as a code whose leading bit starts with "1" indicative of the start of the signal and whose end bit starts with "0" indicative of the end of the signal. The signal is output as a signal pattern capable of specifying an abnormal location owing to the setting of the second and third bits to "1" or "0". To facilitate the detecting operation on the signal detection side herein, data is represented by the number of bits in which data of bits following the leading bit "1" are continuously set to "1".

When the first magnetic sensor 3 is found to have malfunctioned, for example, an error code is set as "1000". When the second magnetic sensor 4 is found to have malfunctioned, an error code is set as "11100". When both are faulty, an error code is set as "1110". Thus, an error code signal Sh corresponding to the produced conditions of each malfunction is produced. While no error code is output when no malfunction occurs, "0000" can be regarded as have been output as an error code indicative of the absence of the malfunction.

Figure 3:
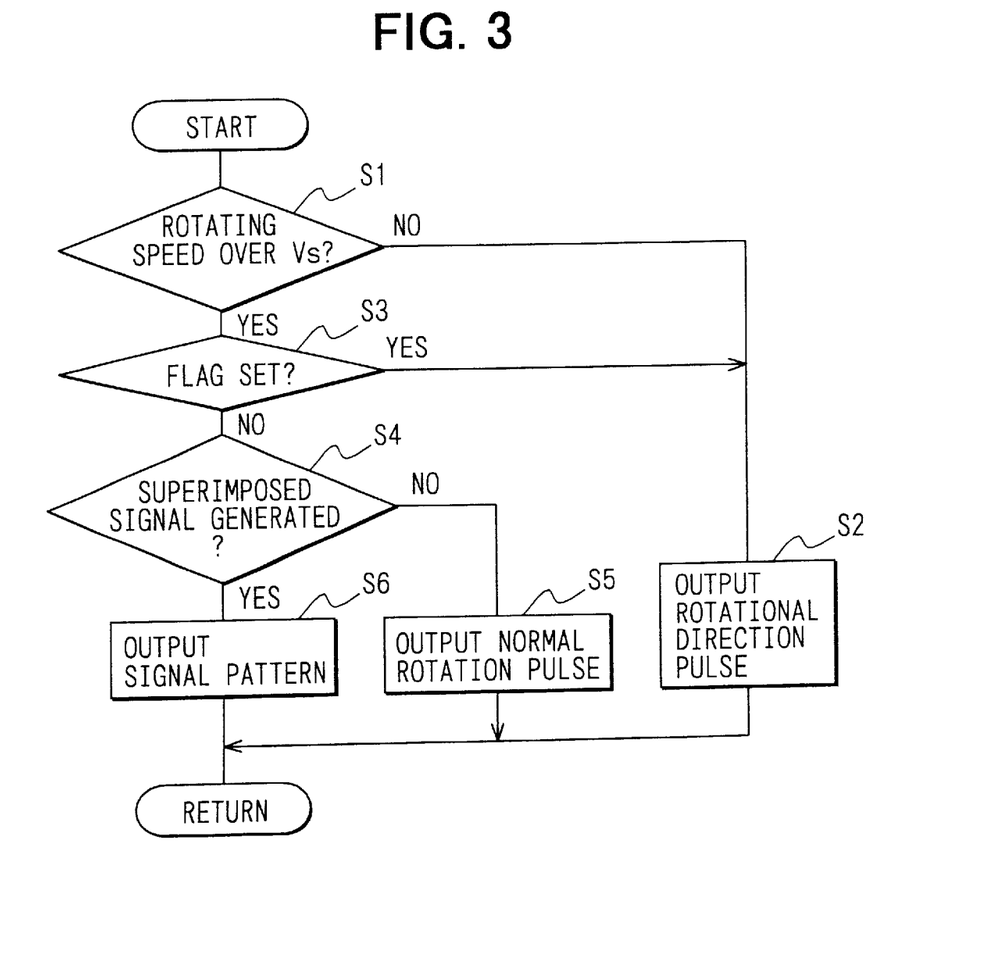
FIG. 3 is a flowchart of a program showing a select control operation of a signal selection circuit according to the present invention.

The operation of the signal selection circuit 8 will next be explained. FIG. 3 shows the process of selecting a signal to be output to the current output circuit 12 by the signal selection circuit 8. Namely, the signal selection circuit 8 determines whether the rotational speed exceeds a predetermined speed Vs (Step S1). When the rotational speed is found not to exceed, the signal selection circuit 8 selects and sets a pulse signal indicative of a rotational direction to output the pulse signal (Step S2).

When it is found that the rotational speed exceeds the predetermined velocity Vs, the signal selection circuit 8 next determines whether the flag is set (Step S3). When the flag is set, the signal selection circuit 8 similarly outputs a pulse signal indicative of a rotational direction (Step S1). Here, the flag is used to determine rotation is stable since the rotation is started or the direction of rotation changes. On the other hand, when the flag is not set, the signal selection circuit 8 determines whether a superimposed signal, i.e., an error signal has been generated (Step S4). When the signal has not been generated, the signal selection circuit 8 outputs a pulse signal for the normal rotation as a normal rotation signal (Step S5). When the signal has been generated, the signal selection circuit 8 outputs a signal pattern for an error code (Step S6).

Figure 4:
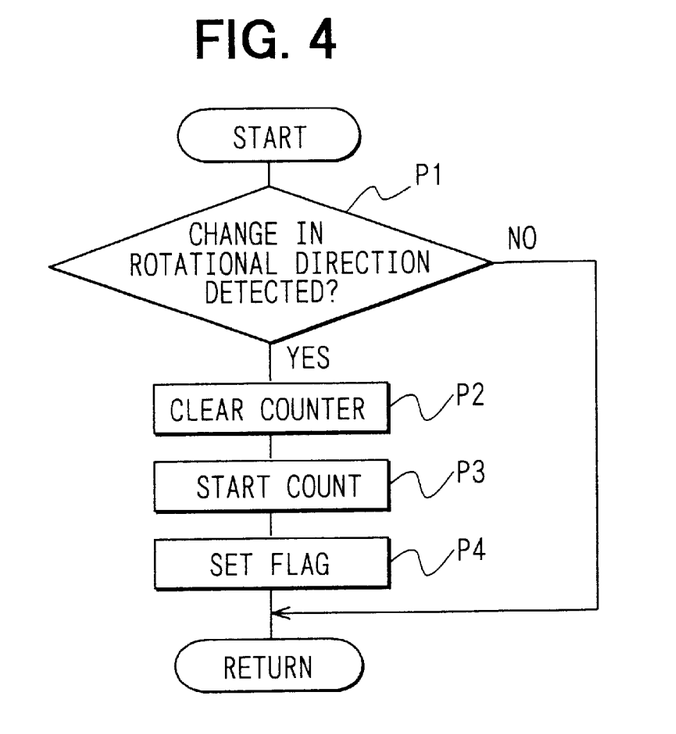
FIG. 4 is a flowchart of a program showing a select control operation of the signal selection circuit according to the present invention.
Figure 5:
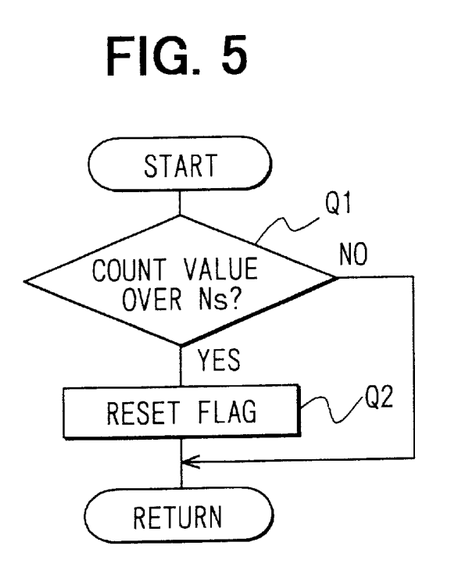
FIG. 5 is a flowchart of a program showing a select control operation of the signal selection circuit according to the present invention.
Figure 6:
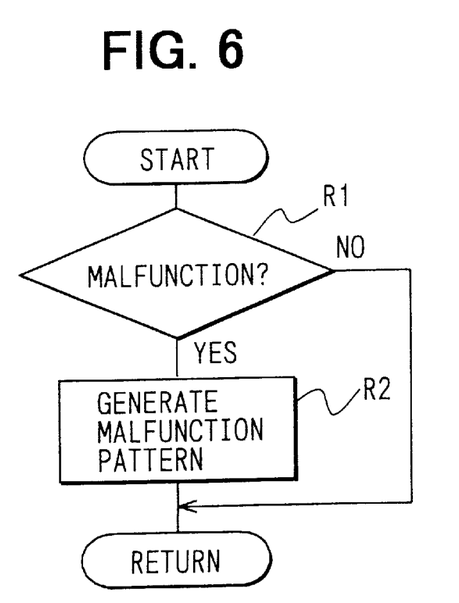
FIG. 6 is a flowchart of a program showing a select control operation of the signal selection circuit according to the present invention.

The signal selection circuit 8 executes the process shown in FIGS. 4 through 6 separately from the above-described operation. Referring to FIG. 4, the signal selection circuit 8 detects the presence of a change in rotational direction (Step P1). When the rotation is newly started or the rotation is started in the direction opposite to the previous rotational direction, a counter is cleared to start the operation of counting a rotation pulse signal, and the flag is set (Steps P2 through P4).

Subsequently, the signal selection circuit 8 continues counting and executes the process of determining a count value shown in FIG. 5. Next, the signal selection circuit 8 determines whether the count value has exceeded a predetermined count value Ns (Step Q1). When the count value has exceeded it, the flag is reset (Step Q2). Thus, the state of rotation of the rotating magnet 1 can be determined as the stable state.

Further, the signal selection circuit 8 executes a process to determine the presence or absence of a malfunction from the self-diagnostic circuit 10. When the signal detection circuit 8 detects a malfunction from the binary error code generating circuit 11 based on an error signal Sg (Step R1), the signal selection circuit 8 similarly produces a pattern for an error code signal corresponding to the malfunction, based on an error code signal Sh input from the binary error code generating circuit 11 (Step R2).

When the output signal selected by the signal selection circuit 8 in the above-described manner is low, the current output circuit 12 provides a flow of an output current Is1 as a current value having a low level. When the output signal is high in level, the signal selection circuit 8 adds a predetermined current Ic produced from the constant current source thereto and supplies the result. As a result, the signal selection circuit 8 provides a flow of output current Is2 (=Is1+Ic) as a current value having a high level (see FIGS. 7I and 8I).

Next, the description of specific operations will be made with reference to FIGS. 7 and 8, based on the above-described operations of the respective units. FIG. 7 corresponds where no error signal Sg is generated from the binary error code generating circuit 11. Where the rotational direction pulse is output from the signal selection circuit 8 (Step S2 in FIG. 3) in this case, a current supplied from the vehicle-mounted battery 14 is output between the external terminals P1 and P2 of the rotation detecting device 2 as an output current Is.

The output current Is is output as the current value Is1 during the generation of a rotation-detected pulse. A current of Is2 flows with timing provided to output the rotation-detected pulse. When the output current Is flows in the detection of resistor 15, terminal voltages Vs become different from each other according to current levels Is1 and Is2 thereof. Thus, a pulse signal corresponding to the number of revolutions of the rotating magnet 1 can be detected. Further, the detection of a time width of the current level Is2 at this time from its corresponding terminal voltage Vs makes it possible to detect the normal rotation of the rotating magnet 1 or its reverse rotation because the pulse width of a pulse signal corresponding to the rotational direction of the rotating magnet 1 is T1 or T2.

When the rotational direction is now changed to the reverse direction as shown, and thereafter the rotational speed of the rotating magnet 1 reaches a predetermined speed and the counted number of rotation-detected pulses reaches a predetermined number and the flag is reset, the signal detection circuit 8 outputs a signal indicative of a normal rotational direction from when the rotating magnet 1 rotated in reverse, even where detection of a malfunction by the self-diagnostic circuit 10 is not done.

When it is detected on the detection circuit side that the rotational speed has reached the predetermined rotational speed as counted from a time interval for rise timing at which the current level of the output current Is reaches Is2, the rotating detecting device transitions a rotation-detected pulse signal to a state for awaiting the input of error code data upon its subsequent detecting operation. Since the pulse width of the current level Is2 flowing through the detection resistor 15 is given as T1 in this case, "0" is detected as being continuous as data and hence the absence of a malfunction can be recognized.

Next, consider where a malfunction occurs in the rotating sensor as shown in FIG. 8. Since the error signal Sg and the error code signal Sh are output from the binary error code generating circuit 11, the binary error code generating circuit 11 outputs a signal pattern (Step S6 in FIG. 3). When a decision signal Sf of a high level at which the rotational speed reaches a predetermined rotational speed, is input to the signal selection circuit 8 from the rotational speed determining circuit 9 (see FIG. 8F) where the error signal Sg is input to the signal selection circuit 8, the signal selection circuit 8 shifts to an error signal priority mode subsequently and outputs a signal corresponding to the error code signal Sh.

Thus, when data for the error code signal Sh is "0", the current output circuit 12 outputs a rotation-detected signal indicative of the normal rotation. When the data is "1", the current output circuit 12 outputs a rotation-detected signal indicative of the reverse rotation. Incidentally, when an error takes place after the output of the decision signal Sf having the high level, the signal selection circuit 8 outputs a pattern for a rotation-detected signal immediately after the error code signal Sh is input.

Thus, an error code signal is detected on the detection circuit side from a pattern for a 4-bit rotational direction signal detected after the determination of where the rotational speed has reached a predetermined rotational speed, whereby a signal indicative of an abnormal condition detected by the self-diagnostic circuit 10 can be detected in addition to information about the rotational speed. Where the rotational speed has reached the predetermined rotational speed in this case, the detection circuit determines data about four pulse signals including a pulse signal indicative of data "1" from when the pulse signal indicative of the data "1" is detected, and makes a decision as to an error code indicative of a malfunction. The abnormal one of the first and second magnetic sensors 3 and 4 can be specified according to the error code signal.

According to the present embodiment described above, the time width of the pulse signal indicative of the number of revolutions is set to the different time widths T1 and T2 to output information corresponding to the rotational direction of the rotating magnet 1. When the rotational speed reaches the predetermined speed, each of the rotational direction signals is set as the digital signal of "1" or "0" and output as the 4-bit error code signal. Therefore, the error code indicative of the malfunction of the self-diagnostic circuit 10 can be output simultaneously in addition to information about the rotational speed and rotational direction of the rotating magnet 1.

Incidentally, the aforementioned embodiment has been made in view of the fact that when the rotational speed of the rotating magnet 1 reaches the predetermined speed, the rotational direction has been fixed or determined in this condition without sudden change. In such a state, the rotational direction is maintained even though the signal in the rotational direction is not output. Incidentally, since the rotational direction may change when the rotational speed is reduced, such rotational speed is detected with timing provided to cause the rotation-detected signal to correspond to the rotational speed. Thus, since the rotational speed can be detected, the inability to detect it does not occur in principle.

Thus, as compared with the prior art in which the patterned data is inserted between the adjacent rotation-detected pulses and output, restraints corresponding to the rotational speed are not placed on the pulse width of each output pulse signal. Further, the signal is resistant to noise or the like and can reliably be detected as an error code signal.

According to the present embodiment, even if the rotational speed of the rotating magnet 1 reaches a predetermined rotational speed, the output of an error code signal is restrained while rotation-detected pulses are counted a predetermined number or more from when the rotational direction thereof changes. Therefore, even if the rotational speed increases immediately and reaches the predetermined rotational speed, the rotation detecting device 2 can prevent a misjudgment due to noise or the like and can reliably output an error signal.

Further, according to the present embodiment, since a rotation-detected signal indicative of a normal rotational direction is output regardless of a rotational direction where no error signal is produced where an error code signal can be output, the size of an output current Is can be prevented from greatly varying according to the rotational direction, and a detecting operation capable of suppressing power consumption can be carried out.

(Second Embodiment)

Figure 10:
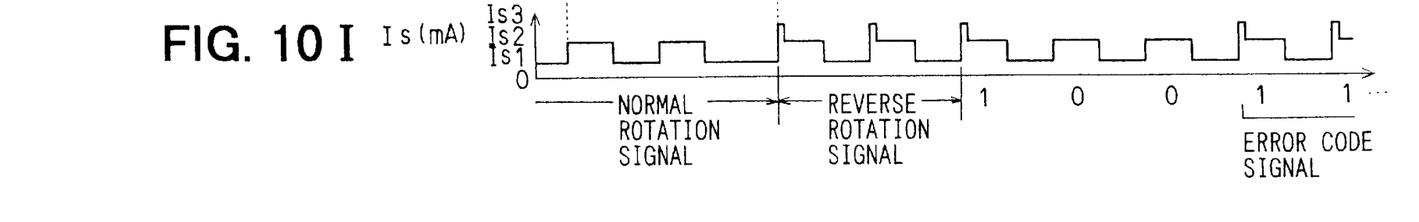
FIG. 10A is a diagram showing error according to a second embodiment of the present invention.
FIG. 10B is a diagram showing error according to a second embodiment of the present invention.
FIG. 10C is a diagram showing error according to a second embodiment of the present invention.
FIG. 10D is a diagram showing error according to a second embodiment of the present invention.
FIG. 10E is a diagram showing error according to a second embodiment of the present invention.
FIG. 10F is a diagram showing error according to a second embodiment of the present invention.
FIG. 10G is a diagram showing error according to a second embodiment of the present invention.
FIG. 10H is a diagram showing error according to a second embodiment of the present invention.
FIG. 10I is a diagram showing error according to a second embodiment of the present invention.
Figure 10A:
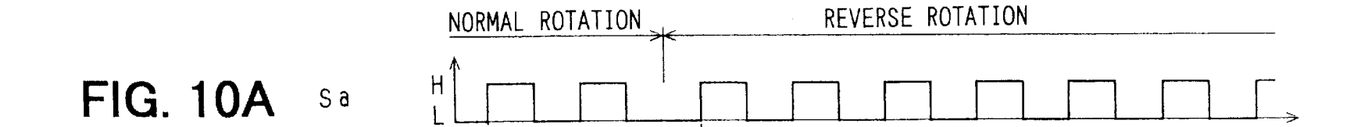
Figure 10B:
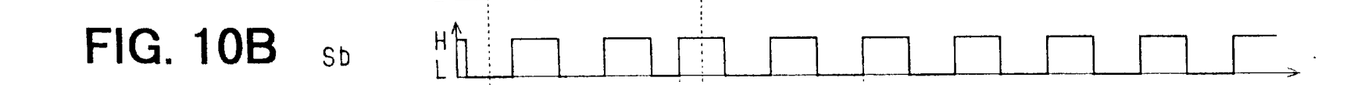
Figure 10C:
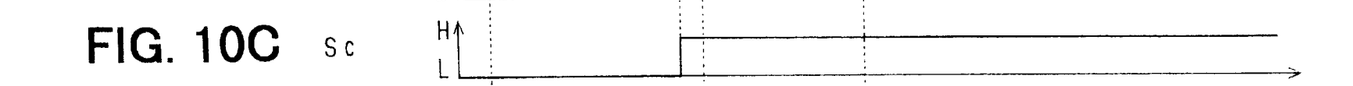

FIGS. 9 and 10 respectively show a second embodiment of the present invention, which is different from the first embodiment in that first and second pulse signals set in the following manner are used without having to use the pulse signals set to differ in pulse width as the rotational direction signals.

Figure 10D:
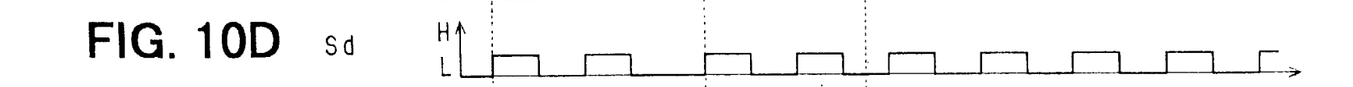
Figures 10E, 10F:
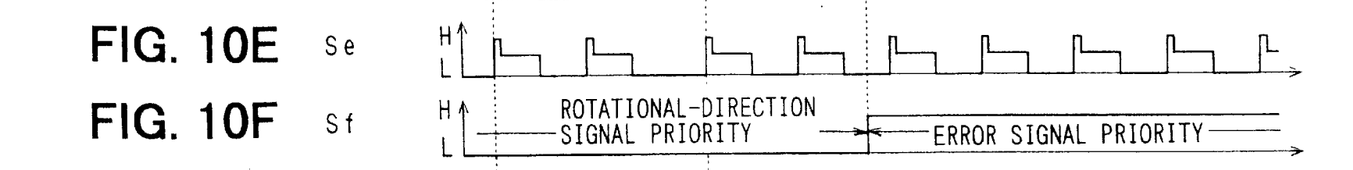
Figure 10G:
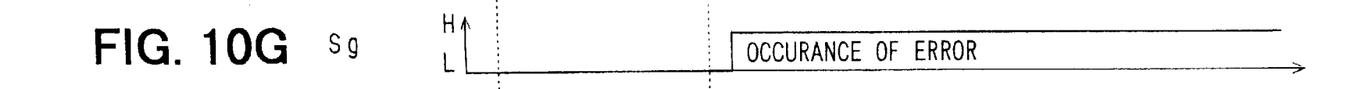
Figure 10H:
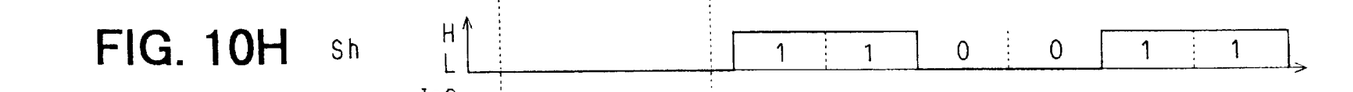

Namely, as the first and second pulse signals employed in the present embodiment, may be used, for example, a first pulse signal Sd (see FIGS. 9D and 10D) set as a normal rectangular wave in a normal rotational direction and a second pulse signal Se (see FIGS. 9E and 10E) in which a pulse signal used as an identification pulse signal, which is narrow in width and large in amplitude, is added to a leading or head position of the first pulse signal Sd in a reverse rotational direction.

In the present embodiment, the first and second pulse signals Sd and Se are generated from first and second output waveform generating circuits 6 and 7 with rise timing of a rotation-detected signal Sa input from a first magnetic sensor 3. Thus, the output number of pulses results in the number of pulses equal to one-half that employed in the first embodiment.

Since the second embodiment is constructed as mentioned above, currents Is output from a current output circuit 12 according to the rotation of a rotating magnet 1 as shown in FIGS. 9 and 10 are represented as shown in the same figures I. Namely, when the rotating magnet 1 is being rotated in a normal rotational direction, a signal of a current level corresponding to the first pulse signal Sd is output with timing corresponding to a rotational speed of the rotating magnet 1, whereas when the rotating magnet 1 is being rotated in a reverse direction, a signal of a current level corresponding to the second pulse signal Se is output with timing corresponding to a rotating speed thereof. In this case, the output current Is changes at binary levels of Is1 and Is2 under the rotational state of the rotating magnet 1 in the normal rotational direction. Further, the output current Is changes at three-valued levels of Is1, Is2 and Is3 under the rotational state of the rotating magnet 1 in the reverse rotational direction. Is3 is one corresponding to the level of an identification pulse signal.

When the rotational speed reaches a predetermined speed, the first pulse signal Sd is output regardless of the rotational direction (see FIG. 9). When a error code signal indicative of a malfunction is generated, an error code signal is output with a signal corresponding to data "1" based on the second pulse signal Se being set as the head.

According to the second embodiment referred to above, when a decision as to a signal indicative of the rotational direction is made, the need for measuring a pulse width is avoided, and whether the identification pulse signal is added to the leading position of the output current Is, can be detected by level determination. Either the first pulse signal or the second pulse signal can be determined at once without detecting the falling edge of a pulse signal.

Further, since the identification pulse signal for identifying the pulse signal is set narrow in width, the difference in power consumption due to the difference between the first and second pulse signals is also small, and a rotation-detected signal and an error code signal can reliably be output while the power consumption is being set to minimum.

Incidentally, the identification pulse signal is added to the leading position of the first pulse signal to generate the second pulse signal in the aforementioned embodiment. However, the identification pulse signal may be added to an intermediate portion of the first pulse signal or an end portion thereof. Further, the identification pulse signal may be added to the end position in addition to the leading position to generate the second pulse signal. In this case, the end of the pulse signal can reliably be recognized.

(Third Embodiment)

Figure 11:
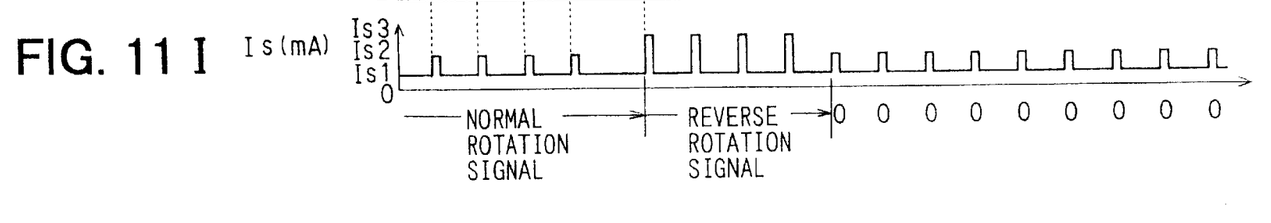
FIG. 11A is a diagram showing no error for a third embodiment of the present invention.
FIG. 11B is a diagram showing no error for a third embodiment of the present invention.
FIG. 11C is a diagram showing no error for a third embodiment of the present invention.
FIG. 11D is a diagram showing no error for a third embodiment of the present invention.
FIG. 11E is a diagram showing no error for a third embodiment of the present invention.
FIG. 11F is a diagram showing no error for a third embodiment of the present invention.
FIG. 11G is a diagram showing no error for a third embodiment of the present invention.
FIG. 11H is a diagram showing no error for a third embodiment of the present invention.
FIG. 11I is a diagram showing no error for a third embodiment of the present invention.
Figure 11A:
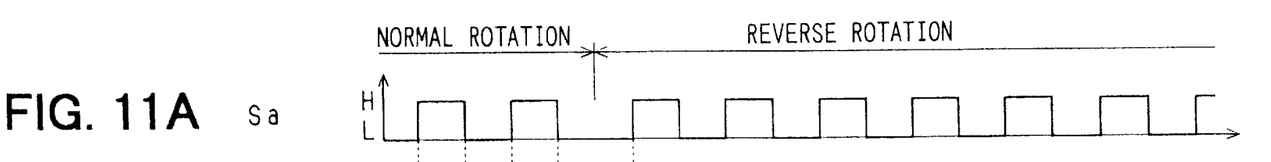
Figure 11B:
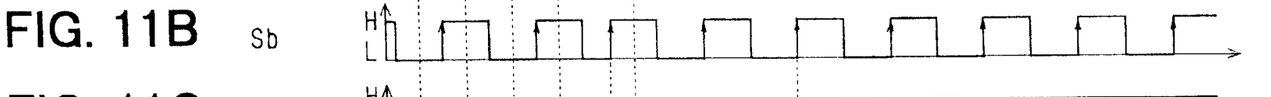
Figure 11C:
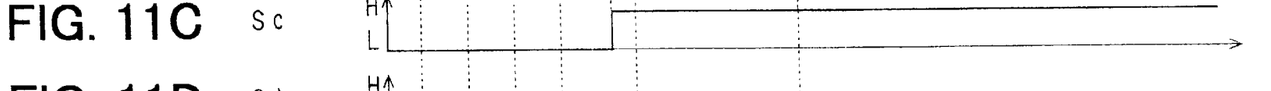
Figures 11D, 11E:
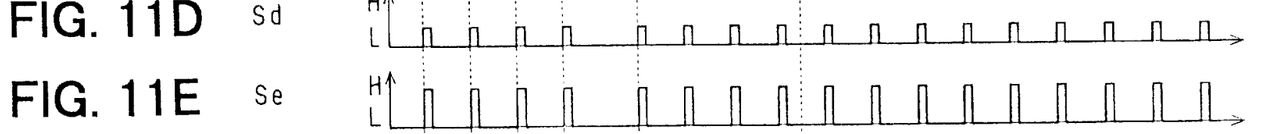
Figures 11F, 11G, 11H:
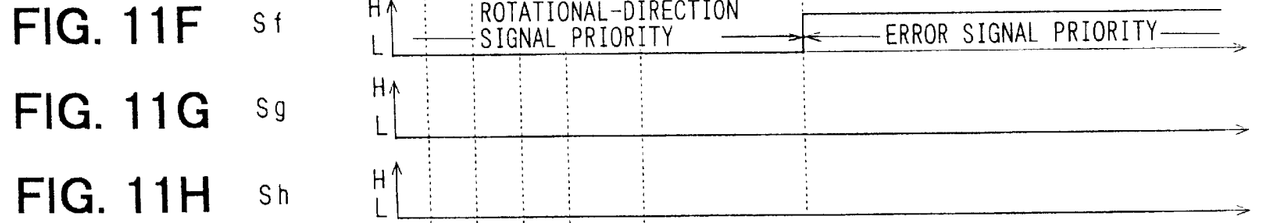
Figure 12A:
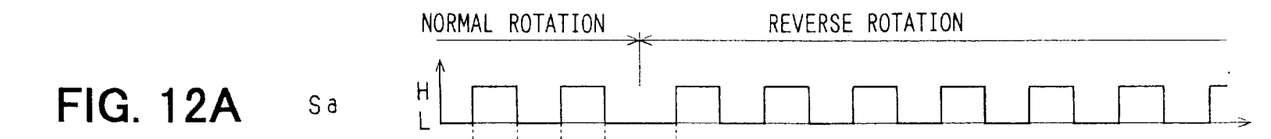
FIG. 12A is a diagram showing error according to a third aspect of the present invention.
Figure 12B:
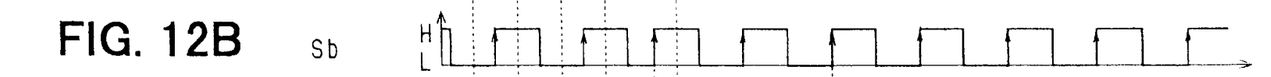
FIG. 12B is a diagram showing error according to a third aspect of the present invention.
Figure 12C:
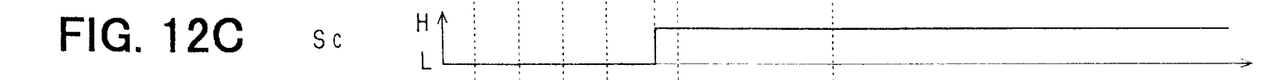
FIG. 12C is a diagram showing error according to a third aspect of the present invention.
Figure 12D:
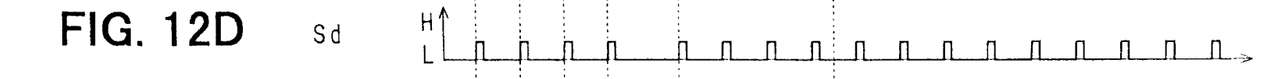
FIG. 12D is a diagram showing error according to a third aspect of the present invention.
Figure 12E:
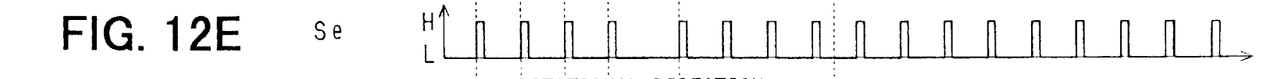
FIG. 12E is a diagram showing error according to a third aspect of the present invention.
Figure 12F:
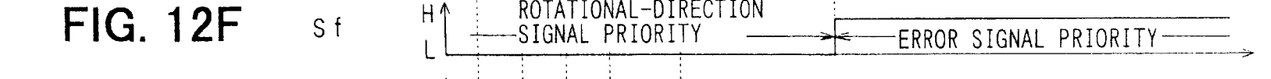
FIG. 12F is a diagram showing error according to a third aspect of the present invention.
Figure 12G:
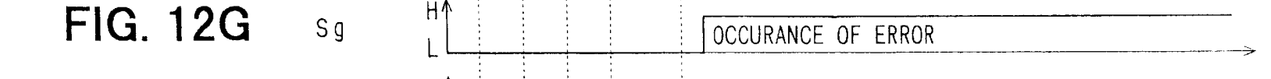
FIG. 12G is a diagram showing error according to a third aspect of the present invention.
Figure 12H:
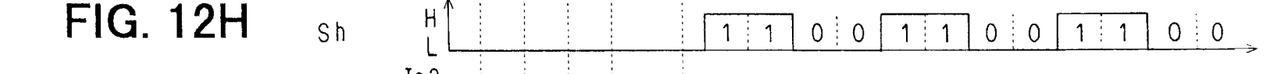
FIG. 12H is a diagram showing error according to a third aspect of the present invention.
Figure 12I:
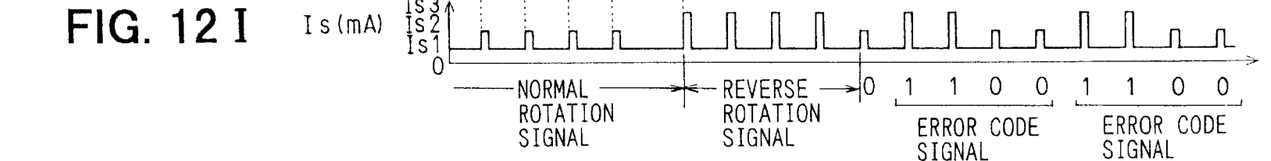
FIG. 12I is a diagram showing error according to a third aspect of the present invention.

FIGS. 11 and 12 show a third embodiment of the present invention. The present embodiment is different from the first embodiment in that pulse signals Sd and Se different in amplitude are set as pulse signals different in waveform, each of which indicates the direction of rotation (see FIGS. 11D and 11E and FIGS. 12D and 12E).

According to the third embodiment referred to above, operation and effects similar to the first embodiment can be obtained. Further, a decision as to the direction of rotation can be carried out easily and promptly by simply determining any of three-valued levels of Is1, Is2 and Is3 as the level of an output current Is without detecting the pulse width of a pulse signal.

The present invention is not limited to only the above-described embodiment and can be modified or expanded as follows:

An error code signal is not limited to the use of four bits. Further, the error code signal may use many bits or may be set as data of 3 bits or less. In either case, settings on the binary error code generating circuit 11 side and a detecting method on the detection circuit side are arranged mutually to allow reliable reception of error codes. While the output of the error code signal is allowed on condition that the predetermined number of counts is made after the rotational direction of the rotating magnet 1 changes. However, the condition for setting the number of counts may be omitted as needed.

While the rotation-detected signal in the normal rotational direction in which less current is provided, is output when the rotational speed reaches the predetermined speed, the rotation-detected signal in the reverse rotational direction may be output. Alternatively, the rotation-detected signal corresponding to the rotational direction may be output as it is.

Even when no malfunction occurs, a signal indicative of the absence of the malfunction may be set and output as a kind of error code as to a error code signal. Thus, information indicative of the self-diagnostic circuit 10 being normally operated and in good order, can be recognized. The error code signals indicative of a malfunction of the self-diagnostic circuit 10 are superimposed and output in the aforementioned embodiment. However, for example, ones obtained by coding detected signals sent from detection sensors for detecting the air pressure of vehicle tires, ones obtained by coding signals indicative of tire wear, and ones obtained by coding other various signals regardless of tires, may be added as signals to be superimposed in addition to the above. The number of signal lines can be reduced.

The type of signal to be superimposed is not limited to one type. A plurality of types are coded on a multiple basis and may be added. Since, in this case, another signal is not superimposed on between adjacent rotation-detected signals in the present invention, no restrictions are placed on the number of bits of a pulse train brought into code form, and the required number of bits can be set and output.

While the above-described embodiments refer to examples of usage of the present invention, it is understood that the present invention may be applied to other usage, modifications and variations of the same, and is not limited to the disclosure provided herein.

What is claimed is:

1. A rotation detecting device, which detects a rotation direction and a rotational speed of a rotor and outputs rotational direction signals having different waveforms according to the rotational direction, said rotational direction signals based on timing corresponding to the detected rotational speed, comprising:
   rotational speed determining means for determining whether the rotational speed of the rotor reaches a predetermined rotational speed;
   signal pattern generating means for utilizing the rotational signals in combination to generate transfer signals, the transfer signals being encoded with information different from the rotational direction and rotational speed of the rotor; and
   signal processing means for signal processing to output a signal generated by the signal pattern generating means with timing corresponding to the rotational speed when a signal generated by the signal pattern generating means exists, where it is determined by the determining means that the rotational speed of the rotor has reached the predetermined rotational speed.

2. The rotation detecting device according to claim 1, further comprising count means for counting a number of rotational direction signals subsequent to a change in rotational direction of the rotor, and wherein the signal processing means processes when the number of the rotational direction signals counted by the count means reaches a predetermined number or more.

3. The rotation detecting device according to claim 1 wherein the rotational direction signals are set such that two pulse signals having different pulse width are associated with normal and reverse rotations of the rotor respectively.

4. The rotation detecting device according to claim 1 wherein the rotational direction signals are set such that two pulse signals having different amplitude are associated with normal and reverse rotations of the rotor respectively.

5. The rotation detecting device according to claim 1 wherein the rotationall direction signals are set with a rectangular pulse signal which is a first pulse signal, and a pulse signal obtained by superimposing a large amplitude identification pulse signal on part of the first pulse signal to form a second pulse signal.

6. The rotation detecting device according to claim 5, wherein the identification pulse signal is set to a leading position of the second pulse signal.

7. The rotation detecting device according to claim 1, wherein each transfer signal is encoded with diagnostic information for the rotating sensor.

8. A rotation detecting device, which detects a rotation direction and a rotational speed of a rotor and outputs rotational direction signals having different waveforms according to the rotation direction, said rotational direction signals based on timing corresponding to the detected rotational speed, said detected signal processing device comprising:
   rotational speed determining means for determining whether the rotational speed of the rotor reaches a predetermined rotational speed;
   signal pattern generating means for utilizing the rotational direction signals in combination to generate transfer signal having information different from the rotational direction and rotation speed of the rotor; and
   signal processing means for signal processing to output a signal generated by the signal pattern generating means with timing corresponding to the rotational speed when a signal generated by the signal pattern generating means exists, where it is determined by the determining means that the rotational speed of the rotor has reached the predetermined rotaional speed. Wherein the signal processing means outputs any one of the rotational direction signals with timing corresponding to the rotational speed when the signals are not generated by the signal pattern generating means where it is determined by the determining means that the rotational speed of the rotor has reached the predetermined rotational speed.

9. The rotation detecting device according to claim 8, wherein the signal processing means sets the rotational direction signal output in where it is determined by the determining means that the rotational speed of the rotor has reached the predetermined rotational speed and when the signals are not generated by the signal pattern generating means, to one reduced in power consumption, of the different rotational direction signals.

10. A rotation detecting outputting method for a rotation detecting sensor, comprising:
   outputting rotational direction signals different in waveform according to a rotational direction of a rotor with timing corresponding to a rotational speed of the rotor thereby output information corresponding to the rotational speed and rotational direction of the rotor; and
   utilizing the rotational direction signals different in waveform corresponding to the rotational direction in combination on condition that the rotational speed of the rotor reaches a predetermined rotational speed to thereby generate a transfer signal, the transfer signal being encoded with information different from the rotational direction and the rotational speed of the rotor as a signal pattern; and
   outputting the generated transfer signal with timing corresponding to the rotational speed.

11. A rotation detecting outputting method for a rotation detecting sensor, comprising:

outputting rotational direction signals different in waveform according to a rotational direction of a rotor with timing corresponding to a rotational speed of the rotor to thereby output information corresponding to the rotational speed and rotational direction of the rotor; and utilizing the rotational direction signals different in waveform corresponding to the rotational direction in combination on condition that the rotational speed of the rotor reaches a predetermined rotational speed to thereby generate a transfer signal different from the rotational direction and rotational speed of the rotor as a signal pattern; and outputting the generated one with timing corresponding to the rotational speed.

Wherein when a transfer signal is not generated where transfer signal can be output, either one of the rotational direction signals is output regardless of the rotational direction of the rotor.

12. The rotation detecting outputting method according to claim 11, wherein when a transfer signal to be output is not generated in a state where a transfer signal can be output, the rotational direction signal reduced in power consumption is output regardless of the rotational direction of the rotor.

* * * * *